(12) United States Patent
Phua et al.

(10) Patent No.: US 10,878,242 B1
(45) Date of Patent: Dec. 29, 2020

(54) VIDEO ANNOTATION BASED ON SKIPPED VIDEO

(71) Applicant: MOTOROLA SOLUTIONS, INC., Chicago, IL (US)

(72) Inventors: Jin Hoe Phua, Bayan Lepas (MY); Soon Hoe Lim, Bayan Lepas (MY); Chung Yong Chong, Bayan Lepas (MY); Yong Sheng Wong, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/792,342

(22) Filed: Feb. 17, 2020

(51) Int. Cl.
*G06K 9/00* (2006.01)
(52) U.S. Cl.
CPC ...... *G06K 9/00671* (2013.01); *G06K 9/00711* (2013.01); *G06K 2009/00738* (2013.01)

(58) Field of Classification Search
CPC ........................ G06K 9/00671; G06K 9/00711
See application file for complete search history.

(56) References Cited

U.S. PATENT DOCUMENTS

| 10,218,760 B2 | 2/2019 | Vishnia et al. |
| 2018/0220199 A1* | 8/2018 | Greenberger ...... G06Q 30/0269 |
| 2019/0058920 A1 | 2/2019 | Singh et al. |

* cited by examiner

*Primary Examiner* — Girumsew Wendmagegn

(57) ABSTRACT

A method and apparatus for annotating video is provided herein. During the process of annotating a video, a skipped portion of video will be analyzed for predetermined events or items. The video immediately following the skipped video will be annotated based on the analysis of the skipped video. The annotation process results in text being added to the video explaining and/or commenting on the predetermined events or items being detected within the skipped video.

11 Claims, 3 Drawing Sheets

VIDEO ANNOTATION BASED ON SKIPPED VIDEO

BACKGROUND OF THE INVENTION

During a police officer's shift, hours of video may be collected. When searching for a particular scene or item within a video, it may be quite time consuming to view the video from start to finish without skipping portions of the video. Unfortunately, skipping video oftentimes leads to critical information being missed, or the currently-viewed video not being placed in a correct context. For example, consider an officer that is interested in whether or not someone encountered a white truck during their shift. In reviewing the video, the officer decides to skip an amount of video by skipping 30 minutes ahead in the video. However, the video skipped may have something interesting that is relevant to the white truck. It would be beneficial if the officer could be notified of the relevant information that was skipped.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for annotating video is provided herein. During the process of annotating a video, a skipped portion of video will be analyzed for predetermined events or items. The video immediately following the skipped video will be annotated based on the analysis of the skipped video. The annotation process results in text being added to the video explaining and/or commenting on the predetermined events or items being detected within the skipped video.

In a preferred embodiment of the present invention, the video immediately following the skipped video will be annotated based on the detection of the predetermined events or items within only the skipped video. The annotation process results in text added to the video explaining and/or commenting on what was missed (i.e., the predetermined events or items) by skipping the video.

It should be noted that the annotation is based on the analysis of the skipped portion of the video. A user may skip any portion of video. So, for example, different lengths of video skipped, or different portions of video skipped will result in different annotations being placed in video directly following the skipped video. Thus, if a first portion of video is skipped, first annotations will be provided in any video following the skipped first portion. However, if a second portion of video is skipped, second annotations will be provided in any video following the skipped second portion. The skipped first and the skipped second portions of video may overlap and may or may not be similar in length. Additionally, the first and second annotations may comprise different subsets of annotations.

Figure 1:
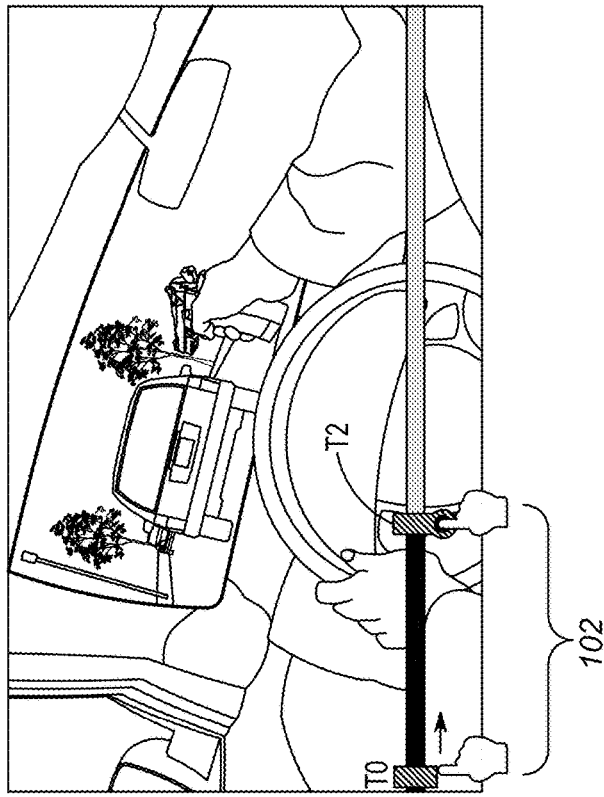
FIG. 1 illustrates a general operating environment.
Figure 1:
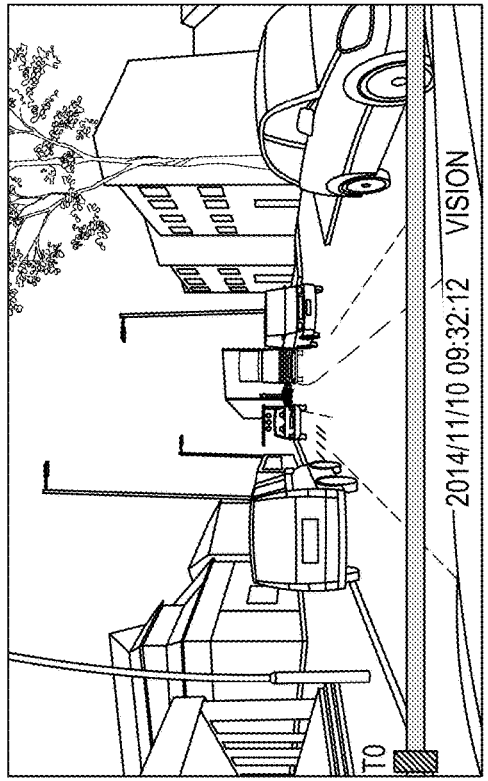
Figure 1:
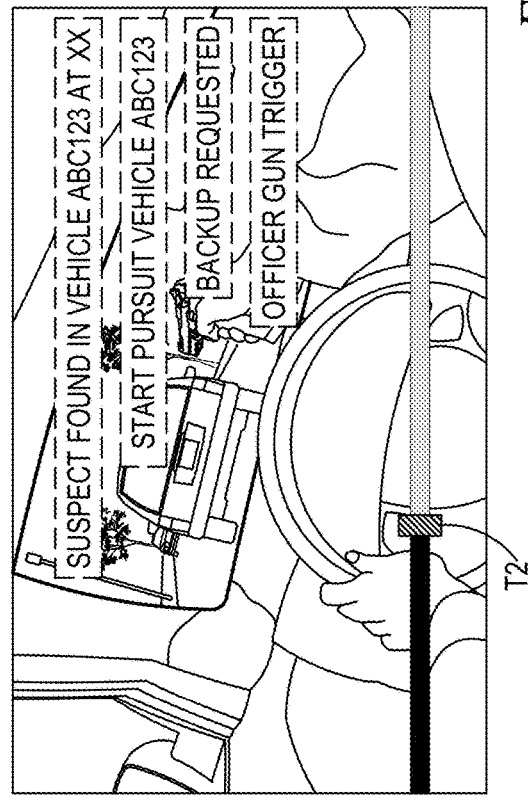

Expanding on the above, consider FIG. 1. FIG. 1 illustrates a video being watched by a user. The user decides to skip a portion of video 102 by dragging a cursor on a timeline forward in time from t0 to t2. Thus, the user has skipped the video between t0 and t2. The skipped video 102 will be analyzed and temporary annotations created that describe events missed by skipping the video (i.e., predetermined events or items that were detected between t0 and t2). As discussed above, the temporary annotations are directly based on events and/or items detected in the video that has been skipped between times t0 and t2.

Figure 2:
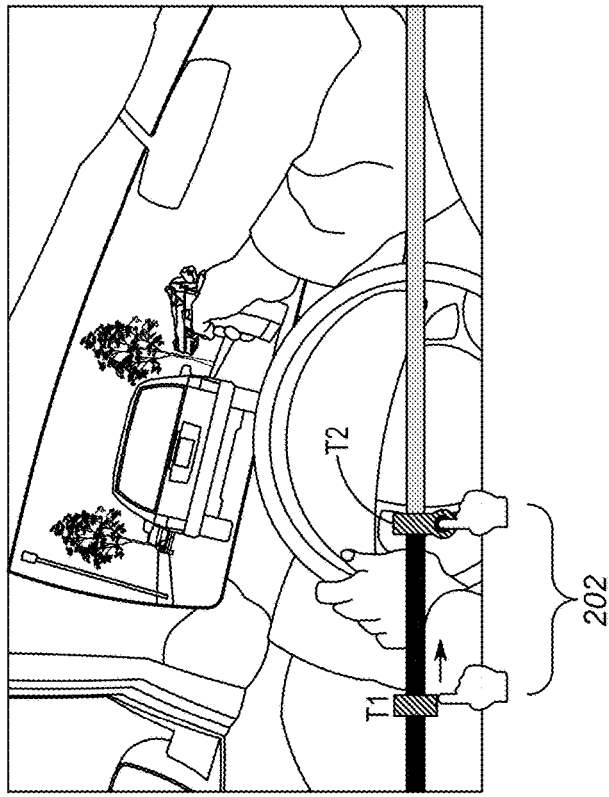
FIG. 2 illustrates a general operating environment.
Figure 2:
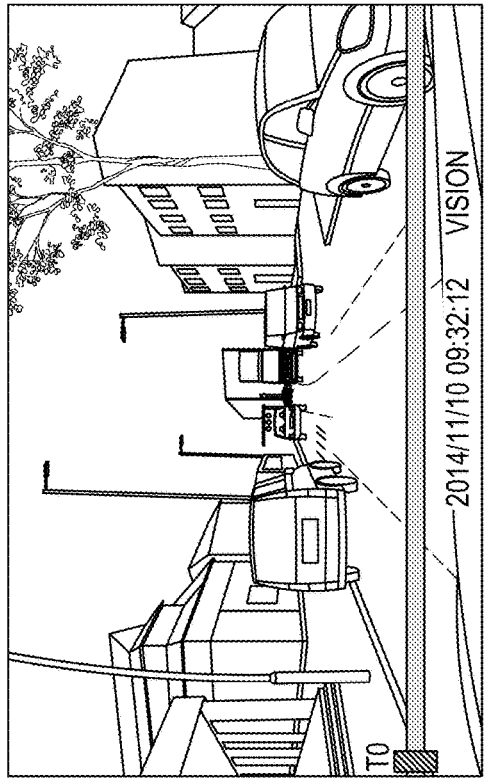
Figure 2:
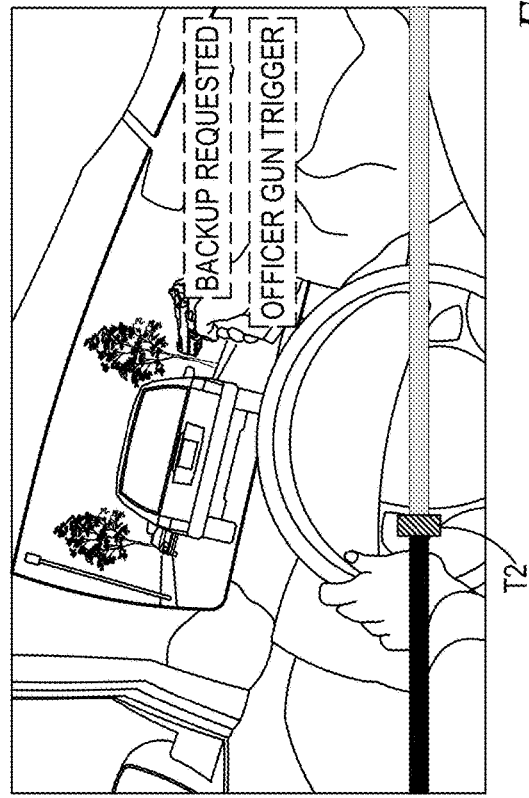

As shown in FIG. 2, the same video was played by a user, however, instead of skipping the video between t0 and t2, the user watches a portion of the video up until t1, and then skips the video between t1 and t2, where t0<t1<t2. Resuming the video at t2 results in a different set of annotations than shown in FIG. 1 being placed within the resumed video (resumed at t2) since less video was skipped and fewer predetermined events and items were detected in the skipped video.

Figure 3:
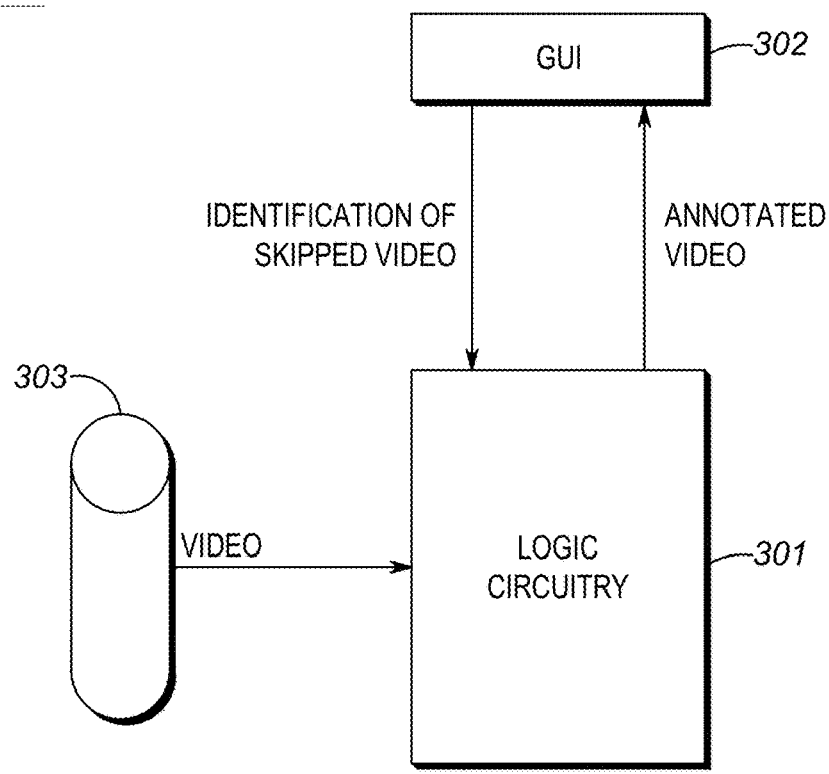
FIG. 3 is a block diagram of a device for annotating images/video.

FIG. 3 is a block diagram of apparatus 300 for annotating video. The apparatus may be located within a dispatch center, police radio, or any other device capable of analyzing and annotating video as described. As shown, apparatus 300 comprises microprocessor (logic circuitry) 301 that also serves to execute a video analysis engine (VAE), Graphical User Interface (GUI) 302, and storage 303.

Although only one GUI 302 is shown in FIG. 3, multiple GUIs may be present. GUI 302 provides a man/machine interface for receiving an input from a user and displaying information. For example, GUI 302 may provide a way of conveying (e.g., displaying) information received from processor 301. Part of this information may comprise annotated video. In order to provide the above features (and additional features), GUI 302 may comprise any combination of a touch screen, a computer screen, a keyboard, or any other interface needed to receive a user input and provide information to the user.

Logic circuitry 301 comprises a digital signal processor (DSP), general purpose microprocessor, a programmable logic device, or application specific integrated circuit (ASIC) and is configured to annotate video (which may be stored in storage 303 or received from elsewhere) as described above. In order to determine the predetermined events and objects within any skipped video, logic circuitry 301 may execute a recognition engine/video analysis engine (VAE) which comprises a software engine that analyzes analog and/or digital video. The particular software engine being used can vary, and is stored in storage 303. In one embodiment, various video-analysis engines are stored in storage 303, each serving to identify a particular object or event (car, gun draw, weapon, person, . . . , etc.). In another embodiment of the present invention, a single video-analysis engine is utilized that comprises all predetermined events and objects desired to be detected within skipped video.

Using the software engine, logic circuitry 301 is able to "watch" video that has been skipped and detect/identify pre-selected objects and/or events. The video-analysis engine may contain any of several object/event detectors as defined by the software engine. Each object/event detector "watches" the skipped video for a particular type of object or event. For example, automobile object detector software may be utilized to detect automobiles, while a fire detection software may be utilized to detect fires. On detecting a particular object/event in the skipped video, logic circuitry 301 will annotate video following the skipped video accordingly, indicating to the watcher of the presence of the predetermined event or object being detected within the skipped video.

It should be noted that in one embodiment of the present invention, skipping video is a trigger for logic circuitry 301 to annotate video. In this embodiment, preferably no annotations exist prior the user skipping the video, and the annotations simply describe what was missed in the skipped video.

It should be noted that while a person may watch a video in real time, logic circuitry 301 will have the processing power to perform video analysis, and determine objects and events skipped much faster than real time, so when the user resumes watching the video after skipping a portion, logic circuitry 301 will be capable determined annotations within seconds.

Database 303 comprises standard memory (such as RAM, ROM, . . . , etc.) and serves to store forms, video, and software engines.

During operation a user instructs logic circuitry 301 via GUI 302 to select a particular video stored in storage 303 for playback. A user may begin watching the video on GUI 302, and then instruct logic circuitry 301 to skip a portion of the video. The identification of the skipped portion of video is passed to logic circuitry 301, and logic circuitry 301 analyzes the skipped portion of the video for particular items and events. When the user resumes watching the video, annotations based on the skipped portion of the video will be temporarily inserted for a predetermined period of time (e.g., for 10 seconds) into the resumed video (i.e., the video immediately following the skipped portion of video).

Logic circuitry 301 may use various software engines stored in memory 303 in order to detect the items and events within the video. As discussed, this will allow logic circuitry 301 to "watch" video and detect relevant information about the skipped video to the user.

As described, device 300 comprises an apparatus comprising a memory configured to store a video, a graphical user interface configured to output an identification of a portion of video that was skipped, and logic circuitry configured to receive the identification of the portion of the video that was skipped, perform video analysis on the portion of the video that was skipped, and annotate the video based on the video analysis on the portion of the video that was skipped.

As described above, the logic circuitry is configured to annotate the video with text to describe detected events or items within the portion of the video that was skipped. Additionally, the logic circuitry is configured to annotate the video at a first spot within the video with a first annotation when a first portion of the video was skipped, and annotate the video at the first spot within the video with a second annotation when a second portion of the video was skipped. As such, the spot where the annotation is placed within the video is based on where the video resumes after skipping. Thus, the logic circuitry is configured to annotate the video at a position in the video immediately following the portion of the video that was skipped.

As discussed, the first portion and the second portion may overlap in time. The logic circuitry is thus configured to temporarily annotate the video based on the video analysis on the portion of the video that was skipped. The logic circuitry is also configured to annotate the video with text to describe only detected events or items within the portion of the video that was skipped.

In order to annotate the video accordingly, the logic circuitry is configured to perform video analysis on only the portion of the video that was skipped.

With the above in mind, FIG. 3 provides for an apparatus comprising a memory configured to store a video, a graphical user interface configured to output an identification of a portion of video that was skipped, and logic circuitry configured to receive the identification of the portion of the video that was skipped, perform video analysis on the portion of the video that was skipped, and annotate the video based on the video analysis on the portion of the video that was skipped;

The logic circuitry is configured to temporarily annotate the video with text to describe detected events or items within the portion of the video that was skipped. The logic circuitry is also configured to annotate the video at a first spot within the video with a first annotation when a first portion of the video was skipped, and annotate the video at the first spot within the video with a second annotation when a second portion of the video was skipped, wherein the first portion and the second portion overlap in time. The logic circuitry is also configured to annotate the video at a position in the video immediately following the portion of the video that was skipped and to annotate the video with text to describe only detected events or items within the portion of the video that was skipped.

Figure 4:
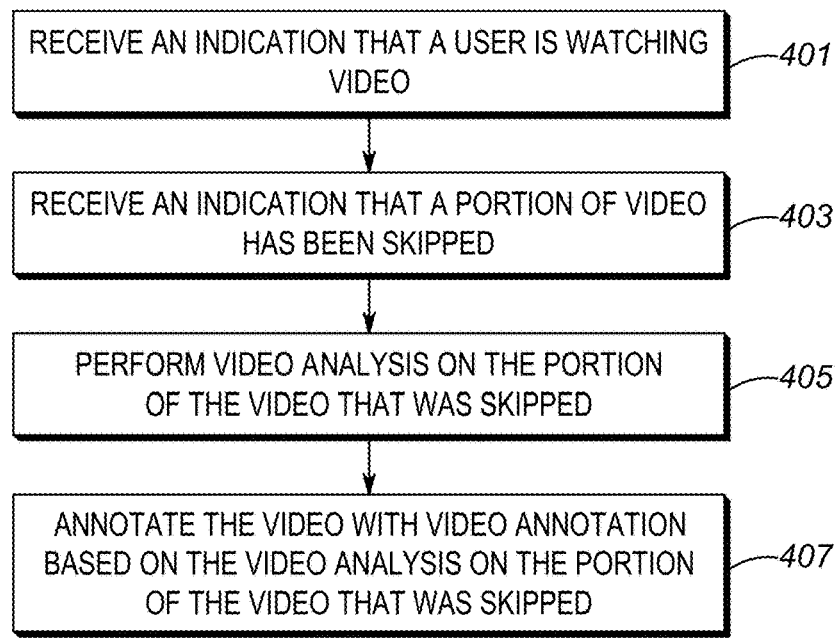
FIG. 4 is a flow chart showing operation of the device of FIG. 1.

FIG. 4 is a flow chart showing operation of device 300. The logic flow begins at step 401 where logic circuitry 301 receives an indication that a user is watching video from GUI. At step 403, logic circuitry 301 receives an indication that a portion of video has been skipped (by a user, or any entity). Skipping video triggers video analysis to be performed by logic circuitry 301 on the portion of the video that was skipped (step 405). Finally, at step 407, logic circuitry annotates the video with video annotation based on the video analysis on the portion of the video that was skipped by the user.

As discussed, the video annotation comprises text that describes detected events or items within the portion of the video that was skipped. Additionally, the annotation exists at a first spot within the video and comprises a first text when a first portion of the video was skipped, and the annotation exists at the first spot within the video and comprises a second text when a second portion of the video was skipped. The first portion and the second portion may overlap in time and the annotation exists at a position in the video immediately following the portion of the video that was skipped.

In the foregoing specification, specific embodiments have been described. However, one of ordinary skill in the art appreciates that various modifications and changes can be made without departing from the scope of the invention as set forth in the claims below. For example, although the above description was given with a user skipping video, one of ordinary skill in the art will recognize that any mechanism may skip video. For example, a system may skip video automatically when video quality is bad (e.g., via an over-the-air reception of poor-quality video). In this scenario, the sender of video may provide annotations as described above indicating what was missed in the skipped video. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a memory configured to store a video;
   a graphical user interface configured to output an identification of a portion of video that was skipped; and
   logic circuitry configured to receive the identification of the portion of the video that was skipped, perform video analysis on the portion of the video that was skipped, and annotate the video based on the video analysis on the portion of the video that was skipped;
   wherein the logic circuitry is configured to annotate the video with text to describe detected events or items within the portion of the video that was skipped;
   wherein the logic circuitry is configured to annotate the video at a first spot within the video with a first annotation when a first portion of the video was skipped, and annotate the video at the first spot within the video with a second annotation when a second portion of the video was skipped.

2. The apparatus of claim 1 wherein the first portion and the second portion overlap in time.

3. The apparatus of claim 1 wherein the logic circuitry is configured to annotate the video at a position in the video immediately following the portion of the video that was skipped.

4. The apparatus of claim 1 wherein the logic circuitry is configured to temporarily annotate the video based on the video analysis on the portion of the video that was skipped.

5. The apparatus of claim 1 wherein the logic circuitry is configured to annotate the video with text to describe only detected events or items within the portion of the video that was skipped.

6. The apparatus of claim 1 wherein the logic circuitry is configured to perform video analysis on only the portion of the video that was skipped.

7. A method comprising the steps of:
   receiving an indication that a user is watching video;
   receiving an indication that the user has skipped a portion of the video;
   performing video analysis on the portion of the video that was skipped by the user; and
   annotating the video with video annotation based on the video analysis on the portion of the video that was skipped;
   wherein the annotation exists at a first spot within the video and comprises a first text when a first portion of the video was skipped, and the annotation exists at the first spot within the video and comprises a second text when a second portion of the video was skipped.

8. The method of claim 7 wherein the video annotation comprises text that describes detected events or items within the portion of the video that was skipped.

9. The method of claim 7 wherein the first portion and the second portion overlap in time.

10. The method of claim 7 the annotation exists at a position in the video immediately following the portion of the video that was skipped.

11. The method of claim 7 wherein video annotation describes only detected events or items within the portion of the video that was skipped.

* * * * *